United States Patent [19]
Decker

[11] Patent Number: 5,177,898
[45] Date of Patent: * Jan. 12, 1993

[54] METHOD FOR PRODUCING SOD

[76] Inventor: Henry F. Decker, 4751 Stover Rd., Ostrander, Ohio 43061

[*] Notice: The portion of the term of this patent subsequent to Jan. 22, 2008 has been disclaimed.

[21] Appl. No.: 590,692

[22] Filed: Oct. 1, 1990

Related U.S. Application Data

[63] Continuation-in-part of Ser. No. 224,939, Jul. 27, 1988, Pat. No. 4,986,026.

[51] Int. Cl.⁵ .................................................. A01C 1/04
[52] U.S. Cl. .............................................. 47/56; 47/9
[58] Field of Search ............... 47/56, 9; 111/1; 71/23, 71/24, 25

[56] References Cited

U.S. PATENT DOCUMENTS 4,716,679  1/1988  Heard ...................................... 47/56

OTHER PUBLICATIONS

Turf Management for Golf Courses, James B. Beard, 1982, p. 604 table C-2.

Primary Examiner—David A. Scherbel
Assistant Examiner—Michele A. Van Patten
Attorney, Agent, or Firm—Isaac Angres

[57] ABSTRACT

A novel method is described for growing tall fescue sods on a solid base in large rolls. Whole culm straw is placed 1-2 inches deep over the solid base, typically plastic sheeting. Thirty to forty cubic yards of composted materials are then applied to the straw, filling the voids and interstices to produce a coherent matrix. This is seeded with tall fescue, then irrigated, fertilized, and mowed in a conventional manner. Unharvested wheat seed left in the straw germinates along with the tall fescue and forms a vigorous primary rooting system which rapidly effects a bona fide sod about one-half inch thick and approximately one-half the weight of a conventional mineral sod. The synthetic sod is harvested in large rolls, typically as much as five feet wide and comprising 20–50 square yards. These big rolls are laid at the installation site by the grading tractor, obviating the need for a fork lift, pallets, and laying crew, as used in conventional sodding.

10 Claims, No Drawings

METHOD FOR PRODUCING SOD

This application is a continuation-in-part of my co-pending application, Ser. No. 07/224,939, filed Jul. 27, 1988, now U.S. Pat. No. 4,986,026.

TECHNICAL FIELD

This invention relates generally to sod production and more particularly relates to the rapid growth of sod over an impervious surface.

BACKGROUND ART

The concept of growing grass sod over a solid or impermeable base such as concrete or plastic sheeting goes back, as far as I know, to experiments conducted by the O. M. Scott Co. in Marysville, Ohio, starting in the summer of 1965. Bluegrass sod was grown over concrete on the front yard of the publisher of the local newspaper. It was grown successfully this way for several years, widely publicized, and used in O. M. Scott Co. advertising.

I started experimenting with and expanding the concept shortly thereafter at nearby Ohio Wesleyan University and demonstrated very shortly that it had several attractive features and advantages compared to the conventional system of growing sod on soil. First, and probably foremost, my research indicated that if grass seed was germinated in a suitable medium placed over a solid or impermeable base, typically 1-6 mil polyethylene sheeting or film, and given optimum growing conditions, the turfgrasses would begin to grow in such a manner that the primary rooting system of the grasses would quickly bind the growing medium into a sod. The sod, complete with the young rooting system, could be peeled or rolled intact and coherent after only a few weeks off the plastic sheeting or impermeable base. Various types of nettings could also be inserted into the growing medium which, as in conventional sodding, enhanced even further the speed with which the sod would be ready to harvest.

The quick formation of the sod was an obvious advantage over the conventional system for producing sod on soil in which 1-2 years or even more are required before the sod is knitted sufficiently to remain coherent when harvested with a sod cutter.

Conventional sod on soil requires the formation of rhizomes, tillers, secondary roots, and stolons, and the intertwining of these growth processes which take a relatively lengthy amount of time to bind the grasses and soil into a sod. The extensive primary rooting system is essentially lost in conventional sod production since it goes deep into the soil and is of little or no consequence in binding of the sod.

On the other hand, by germinating the seed over a solid base, such as plastic sheeting, the primary rooting of the seedlings is trapped, so to speak; and since the primary rooting is quite extensive (one rye seedling has been reputed to produce 17 miles of roots) it runs along the solid base through the growing medium and quickly binds it into a sod in a matter of a few weeks.

The feature of using the primary rooting system of grasses to speed the formation of sod seemed at the time useful and valid, and I incorporated the research into a patent disclosure (#012097) in July of 1972, followed a year later by a patent application (#371,462). During the time, however, that the patent was being reviewed it became apparent that the methods did not translate well into the large scale type production demanded by the U.S. sod industry. I could not make the transition from the greenhouse bench, laboratory, or small plot to a field scale production. I subsequently abandoned the patent application as being premature, but I did publish my observations in the trade magazine, *Weeds, Trees, and Turf*. The methods, as they existed at that time, were simply not cost effective in competition with the U.S. sod industry which by the 1970's had become large in scale, efficient, and highly mechanized.

Other workers in Great Britain, such as Goodall, Dawson, and Loads, faced similar difficulties and also the disadvantage that they were not familiar with the U.S. sod industry. All of their processes failed the test of practicality and cost effectiveness. As a result, none of these inventions became commercially significant in the U.S. because of inherent problems that at the time were difficult or even impossible to solve. The problems are discussed below:

First, and probably the main problem, has been the availability of an inexpensive, yet plentiful growing medium. Hundreds of things appear to work in a greenhouse or small plot until one considers the weight, cost availability, ease of handling, trucking, spreading, and the expense to bring the growing medium up to nutritional minimums;

Second, the amount of growing material required to cover an acre sheet of plastic one inch deep translates into 134 cubic yards or over 20 single axle dump truck loads per acre! Quantities of rooting material of this dimension, their handling, and manipulation are obviously too expensive to be competitive with the conventional sod on soil process;

Third, placing an exact amount of growing material (such as one-fourth inch as proposed by Loads) evenly over acres of plastic film proved very difficult. While it worked "indoors" under controlled conditions in a greenhouse flat, it could not be readily obtained on a field scale. Furthermore, one-fourth inch of material outdoors was an insufficient amount of rooting material under the best conditions. Even one inch of material was not successful: it could not be spread or maintained evenly. A slight thunderstorm of the type prevalent in the Midwest would sheet erode the growing medium, washing it off the plastic film or other base, causing gaps that prevented continuous rooting and hence sod formation;

Fourth, some provision had to be made to eliminate or at least reduce the effect of thunderstorms or heavy rains on the early stages of the sod development. Any upsetting of the thin patina of growing material over the base produced gaps and distortions that prevented continuous rooting and hence sod formation;

Fifth, another important consideration is damping-off disease. Since the primary rooting of the seeding will functionally knit the sod (rather than the secondary rooting, rhizomes, stolons, tillers of conventional sod), the seeding rate is increased which in turn increases the incidence of damping-off. This devastating disease is expensive and often impossible to control with fungicides;

Sixth, the use of foams, of containers as proposed by Dawson, or of curbs as proposed by Loads, or of burlap as proposed by Goodall, or of rolling up the plastic film to transport the grass as in Blackburn, were all too expensive to be considered. The process had no validity whatsoever unless the plastic film could be used over and over again; and Finally, seventh, conventional sodding is very labor intensive. Significantly reducing the amount of hard labor involved has to be a prime attribute of any alternative sodding system.

These major problems then, had to be solved before any alternative sodding system could literally get off the ground. Starting in the 1982 season several things began to make an alternative sodding system more feasible. In essence, it became possible to solve the problems.

First, around the country the Beltsville system of composting sewage sludge has begun to catch on. Suddenly, at least in Central Ohio, there is a readily available source of growing materials which in large quantities is being offered at an attractive price. This "Com-Til", as it is called in Columbus, Ohio, was quickly determined to support the growth of turfgrasses without amendment. It was not only charged naturally with the right nutrients for grass culture, but it was also established that it retarded the development of damping-off and other fungal diseases! Problems No. 1 and 5 above then were solved in one step.

Preliminary studies at Ohio Wesleyan University also indicated that, beside composted sewage sludge, it was possible to grow tall fescues as well as other perennial grasses, such as bluegrasses, bentgrasses, perennial ryegrasses, and fine fescues on other types of composted organic materials, such as composted animal manures and composted yard wastes. These latter materials could also be mixed with composted sewage sludges.

Next, I made the important discovery that wheat straw could be used not only to protect the solid base from truck and tractor traffic, but also to keep the growing medium in place in a thunderstorm. Furthermore, in the right condition, I discovered that the straw actually substituted for additional growing media, that is conferred some unidentified biological property in the mix that encouraged the growth of turfgrasses. Thus, the straw made it possible to drastically reduce the amount of expensive growing medium required to effect a sod. In addition, it eliminated the problem of having to spread the medium on a solid base with a uniform thickness that was impossible to obtain. These new uses for straw were the most important discoveries made and effectively solved Problems 2, 3, and 4.

Another recent important development in the turf industry has made an alternative sod more feasible: that is the introduction of turf-type tall or coarse fescues. These new turf cultivars have several advantages over bluegrass. They are more drought, insect, and disease resistant. They are more durable on playing fields and they germinate and root more quickly, more vigorously than bluegrass. On the other hand, the tall fescues do not produce rhizomes and stolons and hence do not lend themselves to conventional sod production. In practice these drawbacks are compensated for by growing the sod for a longer than usual period by laying sod netting and by adding bluegrass to the tall fescue seeding. The netting, however, is expensive and difficult to use, and the bluegrass in time is much more aggressive than the tall fescue. Eventually it takes over the turf with the new lawn becoming heterogeneous and the tall fescue scattering into unsightly clumps.

These apparent disadvantages to growing a tall fescue sod in a conventional manner turn out to be much strengths when tall fescue is considered as the main ingredient of an alternative sod grown on a solid base. The vigorous and rapid primary rooting gives the tall fescue cultivars a distinct advantage over the less vigorous bluegrass.

The tall fescue cultivars have one more subtle but very important advantage over other turfgrasses which I will explain. In the past, it has been impossible to find wheat straw that was totally free of unharvested wheat seed. In the production of an alternative bluegrass sod this wheat seed would germinate much more quickly than bluegrass, obscure it, and retard its development. As well, wheat seedlings are much more coarse than fine turf premium bluegrasses and do not readily mow out and then the new sod quickly becomes ragged, unattractive, and, in fact, unsaleable.

When tall fescue turf is grown, however, the wheat seed germinates at about the same speed. Furthermore, the width and coarseness of the wheat blades is more comparable to that of the tall fescue when mowed close, and hence the new turf looks more uniform. As well, the wheat also has a vigorous primary rooting system which aids the rapid development of the sod. Initially, at least, the annual wheat withstands close mowing, even to an inch or less, and acts, in fact, as a beautiful nurse crop.

Another advantage to the tall fescue/wheat seeding is that it germinates quickly, in a matter of days, and hence lends to the new sod a more rapid resistance to thunderstorms than when bluegrass constitutes the primary seeding.

Technically speaking, it is important to my alternative system to start not just with wheat "straw", but, in fact, with the whole culm, including the inflorescence. Even a rotary combine will leave enough mature caryopses in the spikelets to benefit the early formation of the alternative tall fescue sod. No longer objectionable, the unharvested wheat seed is now desirable.

In summary, then, the tall fescue/wheat seeding germinates much more quickly than bluegrass; its coarse texture is homogeneous and not unattractive; and coupled with quick germination, is a very rapid, extensive, primary root growth. I have discovered that this fall fescue/wheat primary root growth is so vigorous that it can be grown with or without nettings, gels, absorbents, or any supplemental bluegrasses. Furthermore, the new sod can be produced in much less time and at considerable savings in weight than conventional tall fescue sod on soil.

The whole culms are spread about two inches deep over the solid base and now only 30–40 cubic yards of growing material/acre are required. This is spread over the straw and seeded conventionally. The rooting material fills the voids and interstices of the straw making a coherent, thunderstorm resistant, germinating matrix.

I discovered that in a few weeks the initial two inches of straw will compress and decompose into a mat or sod approximately one-half inch thick. The binding quality of the straw, plus the external primary rooting system of the grasses combine to make a bona fide sod of high quality.

Harvesting the alternative sod has a distinct advantage over conventional sodding techniques. With the primary rooting intact, the sod is lifted, grabbed, and cut (without cutting the plastic which will be used again), and then rolled off the plastic sheeting onto a tube by a harvesting mechanism of my design. In this manner, it is possible to produce rolls of sod much larger than the typically one yard sod sheets or rolls produced by Ryan, Princeton or Brouwer sod harvesters. I can produce sod rolls consisting of 30 square yards or more. Furthermore, a roll this size would have one-fifth as many seams as in conventional sodding comprised of one yard rolls. These large rolls are loaded directly; no pallet is required. At the laying site the rolls are unloaded and installed or unrolled by the grader and raker . . . thus obviating both a fork lift and a laying crew. This is a significant reduction in labor.

The solid base alternative sodding system is now competitive.

BRIEF DISCLOSURE OF INVENTION

An alternative, solid base accelerated method for producing sod in big rolls is presented. The method does not require sod netting or bluegrass to knit the sod as in conventional sod production. Furthermore, the method produces a sod more quickly which is lighter in weight; and it can be harvested, shipped, and installed in large thirty yard rolls that obviate the need for pallets, fork lifts, and a laying crew. The improved process can be done on a large scale and is competitive with conventional U.S. sod production.

The synthetic sod is produced by placing whole culm straw or other vegetative stalks over a solid base, such as 1-6 mil plastic sheeting, and then applying 30-40 cubic yards per acre of composted materials to the stalks. The plastic sheeting provides a root impervious barrier and may also be moisture impervious. The relatively inexpensive stalks substitute for and reduce the quantity of expensive growing medium required. It also obviates the need for having to spread the growing medium to a uniform thickness that is difficult to obtain, and it helps knit the compost together to protect the entire system from sheet erosion in a thunderstorm. The compost/stalk growing medium is now seeded with turf-type tall fescue or other suitable grass seed. Wheat seed that was left inadvertently in the whole culm straw will germinate along with the turfgrass after irrigation and will play a prominent role in knitting up the sod. Other nurse crop seed may alternatively be used. The primary rooting systems of both the tall fescue and the wheat are very vigorous and very shortly bind the growing system into a coherent, bona fide sod, one-half inch or so thick, that can be harvested in large thirty yard rolls. The solid base is left intact to be used again. Since the primary root system has been maintained and harvested intact, when the new sod is installed, it requires much less water to become established at the new site.

In describing the preferred embodiment of the invention specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

My research has led to the discovery of a vastly improved, solid base, accelerated, alternative method for growing tall fescue sod in large rolls. The solid base can be provided by any surface that restricts root penetration, but typically is 1-6 mil plastic sheeting or film unrolled over a graded bed of soil. The grading should be done so as to facilitate drainage.

Harvested whole culm wheat straw is then spread 1-2 inches over the solid base. While a deeper layer may be used, it is not necessary and adds unnecessary cost. A layer which is less than approximately one inch is too thin to be sufficiently effective. I say whole culm because it is desirable to have at least some inflorescences left on the straw in order that some mature wheat caryopses will be placed in the seed bed. The reason for this will become apparent below.

The straw will act as a binder, filler, mulch, and, most important, it was discovered, substitute partially as a growing medium for the new seeding. It will maintain the integrity of the growing system in a thunderstorm and it will obviate the need to spread the subsequent growing medium at a uniform thickness that is difficult to obtain. Furthermore, the straw will drastically reduce the amount of growing medium required in the next step.

Because one function of the straw is to help knit the sod together, other vegetative stalks, such as hay, may also be substituted. If the vegetative stalk material does not already contain suitable seed, an annual nurse crop seed may be added to perform the function of the wheat seed.

A special preferred growing medium is now spread over the 1-2 inches of straw at the preferred rate of 30-40 yards/acre. It will fill the voids and interstices of the whole culm straw. This medium is composted municipal sewage sludge in our area called "Com-Til" which is rich nutritionally and will support turfgrass growth without amendment. It also provides resistance to damping-off disease, a very important consideration at high seeding rates. The composted growing medium can be as little as 10 yards per acre and as much or more than 40 yards per acre as desired, but such excess is not necessary and serves to increase cost.

Tall fescue seed is now spread evenly over the Com-Til/whole culm mix. To produce more primary rooting, the seeding rate is raised slightly (to 8-10 lbs/1000 sq. ft.) over a typical tall fescue seeding-about 10 to 20 percent higher rate by weight. It is protected from damping-off by the Com-Til.

The mix is now irrigated and grown essentially like any conventional grass sod. In a few days the wheat caryopses provided by the whole culms will germinate along with the tall fescue seed and these two vigorous root producers will begin to effect a sod. As with conventional sod growing, standard fertilizers are added as needed, but few or no herbicides or pesticides are required. Mowing begins as soon as the grass is 1-2 inches high to encourage tillering. Because the composted growing medium is infiltrated down into the previously placed layer of vegetative stalks, preferably straw, the stalks form an intertwined reinforcing matrix to help bind and knit the sod as the stalks themselves compost. Thus, as the stalks gradually compost, the root systems of the nurse crop and the perennial grasses gradually replace the stalks.

In the production of conventional tall fescue sod, the harvester cuts off the primary root system. In order to knit the tiller-type grass, then a rhizomatous bluegrass and sod netting are added at seeding time. On the other hand, this synthetic sod is formed by the primary rooting systems, left intact, of the tall fescue and wheat. The sod is also formed more quickly, in at least half the time of a conventional sod. The primary rooting systems of the tall fescue and wheat are so vigorous that adding sod netting and rhizomatous bluegrass seed, as in the production of conventional tall fescue sod, are obviated.

After a few weeks the 1-2 inch layer of straw has compressed and decomposed into the growing medium into a mat or sod about one-half inch thick. This is now harvested in big rolls, cut five feet, more or less, wide into rolls comprising 20-50 square yards. It is important not to cut the base of plastic film since this will be left in place to be used over and over again. To accomplish this, an area of the sod is lifted so that it is spaced above the plastic film and then cut without puncturing the film. Preferably, it is cut along spaced, generally parallel, vertical planes to form a ribbon of sod. This ribbon is then wound into the rolls. The big rolls are lifted onto a flat bed truck and transported to the installation site. On the basis of weight, the synthetic sod has been running about 50% and lighter with only one-fifth as many seams as one of our conventional mineral sods.

Further savings are obtained at the laying site where only the grading tractor is needed to unload and unroll the sod. One laborer, the hand raker, is helpful in positioning and cutting the sod rolls as needed. Those familiar with conventional U.S. sodding will immediately recognize that a fork lift, pallets, and a laying crew have been eliminated.

An indirect advantage is also conferred on the synthetic sod by the nature of the system. The primary root system has been harvested intact and when the sod is laid on the new site, it requires much less water to become established in comparison to conventional sod, where most of the root system has been cut off in the harvesting and has to reform.

While certain preferred embodiments of the present invention have been disclosed in detail, it is to be understood that various modifications may be adopted without departing from the spirit of the invention or scope of the following claims.

I claim:

1. A method for producing a grass sod having substantially less weight than conventional sod, the method comprising:
    (a) placing a layer of a mixture of vegetative stalks upon a root impervious barrier;
    (b) infiltrating composted growing medium down into the interstices of the stalk layer, said composted growing medium being selected from the group comprising composted animal manures, composted yard wastes, composted sewage sludges or mixtures thereof;
    (c) seeding with perennial grass seed and an annual nurse crop seed; said perennial grass seed being selected from the group of bluegrasses, tall fescue grasses, bentgrasses, fine fescue grasses and perennial ryegrasses;
    (d) allowing both the annual nurse crop seed and perennial grass seed to germinate and grow a combined primary root system of perennial grass and root system of nurse crop to knit the stalks and composted materials into a sod; and
    (e) harvesting the sod.

2. A method in accordance with claim 1 wherein the annual nurse crop seed is mixed in the stalks before the composted growing medium is infiltrated.

3. A method in accordance with claim 1 wherein said perennial grass seed is a tall fescue seed.

4. A method in accordance with claim 1 wherein said vegetative stalks are straw and said nurse crop seed is unharvested seed from the same crop as the straw.

5. A method in accordance with claim 4 wherein said straw is whole culm wheat straw.

6. A method in accordance with claim 1 or 2 or 3 or 4 or 5 wherein said layer of stalks is at least substantially one inch deep and said composted growing medium is infiltrated at a rate of at least 10 cubic yards per acre.

7. A method in accordance with claim 6 wherein said composted growing medium is infiltrated at a rate in the range of substantially 30 to substantially 40 cubic yards per acre.

8. A method in accordance with claim 1 wherein said annual nurse crop seed is wheat seed.

9. A method in accordance with claim 1 wherein said composted growing medium selected from the group consisting of composted yard waste, composted animal manures, composted sewage or sludge and mixtures thereof.

10. A method in accordance with claim 1 wherein the perennial grass seed is tall fescue.

* * * * *